United States Patent [19]

Landry et al.

[11] Patent Number: 4,775,566
[45] Date of Patent: Oct. 4, 1988

[54] HIGH TEMPERATURE FLEXIBLE UNITARY SLEEVING INSULATION

[75] Inventors: Louis G. Landry, Somersworth; Fabian Nunez, Dover, both of N.H.

[73] Assignee: Essex Group, Inc., Fort Wayne, Ind.

[21] Appl. No.: 896,795

[22] Filed: Aug. 15, 1986

[51] Int. Cl.4 .......................... F16L 11/12; H02K 3/04
[52] U.S. Cl. ..................................... 428/36; 428/228; 428/266; 428/268; 428/391; 156/149; 138/DIG. 2
[58] Field of Search ......... 138/124, 125, 126, DIG. 2; 310/208, 43; 428/391, 36, 228, 266, 268, 273; 156/307.1, 307.3, 308.2, 149

[56] References Cited

U.S. PATENT DOCUMENTS

| | | | |
|---|---|---|---|
| 2,202,820 | 6/1940 | Baird et al. | 171/321 |
| 2,939,488 | 6/1960 | Bacon | 138/126 |
| 2,965,151 | 12/1960 | Elliot et al. | 138/126 |
| 3,223,565 | 12/1965 | Fritz et al. | 156/86 |
| 3,388,458 | 6/1968 | Logan | 29/596 |
| 3,698,982 | 10/1972 | Griffin | 156/307.3 |
| 4,102,360 | 7/1978 | Hopkins | 138/126 |
| 4,379,243 | 4/1983 | Dailey et al. | 310/260 |
| 4,389,587 | 6/1983 | Levine et al. | 310/208 |
| 4,452,279 | 6/1984 | Atwell | 138/126 |
| 4,704,335 | 11/1987 | Landry et al. | 428/36 |

*Primary Examiner*—John E. Kittle
*Assistant Examiner*—B. A. Bozzelli

[57] ABSTRACT

The present invention discloses a glass covered electrical insulation having an inner lining of glass fibers coated with a flexible, high temperature, electrically insulating silicon polymer, the electrically insulating layer then has a second layer of glass fibers overbraided on it and bonded to it by the use of a heat treating process. A further teaching is the method of making the flexible sleeving and a method of use. The sleeving is particularly adapted for use in VPI processing and has superior flexibility as well as higher temperature capabilities than sleeving of the prior art.

4 Claims, 1 Drawing Sheet

4,775,566

HIGH TEMPERATURE FLEXIBLE UNITARY SLEEVING INSULATION

DESCRIPTION

1. Technical Field

The field of art to which this invention pertains is electrically insulated conductors and specifically electrical insulation sleeving for such conductors.

2. Background Art

With a view towards cost saving and efficiency in manufacturing in recent years, the use of a vacuum pressure impregnation (VPI) of insulating resin for form wound motor coils has become increasingly prevalent. In a typical VPI process, a previously insulation-wrapped coil, either individually or in a stator, is processed by: (a) preheating it; (b) subjecting it to a vacuum for a predetermined period of time; (c) introducing the insulating resin in liquid form into the coil under vacuum; (d) increasing the pressure on the coil in the presence of the liquid resin until it substantially impregnates the coil; (e) releasing the pressure and draining off any resin which does not so impregnate; and (f) baking the impregnated coil.

The use of such impregnation method is intended to introduce the impregnating insulating resin into all the existing interstices of the coil and insulating coil wrapping, since unimpregnated areas result in voids which cause increased dielectric breakdowns or lower dielectric breakdown voltages.

Since the junction points at which the coil leads are brazed to the form wound coil must be insulated, many manufacturers have been using multiple layers of sleeving to obtain such insulation. Typically, either one of two combinations is used to insulate this junction point and the lead itself: either a heat treated fiberglass sleeving placed over Grade A acrylic resin coated fiberglass sleeving (by American Society for Testing and Materials (ASTM) D 372 standards sleeving which can withstand 7000 volts average impressed voltage without breakdown), or heat treated fiberglass sleeving placed over two lengths of Grade A acrylic resin coated fiberglass sleeving which previously have been "telescoped" (inserted one into the other).

Although these methods of insulating the junction points are very labor intensive as well as relying heavily on operator skill and conscientiousness, if a VPI process is used, there has been very little alternative to this telescoping method. It has not been possible to use a single Grade A acrylic resin coated sleeving because the insulating impregnating resin does not adhere sufficiently to the acrylic resin coated sleeving to insulate the coil lead adequately. It has therefore been necessary to add a layer of heat treated, uncoated fiberglass sleeving to the lead insulation to which the VPI insulating resin would readily adhere, in order to obtain a final sleeving insulation which provides adequate mechanical as well as electrical protection.

One approach to simplifying and improving the process of insulating such coils has been to form the insulating sleeve into a unitary unit by coating the exterior of an electrically insulating inner layer with an electrically insulating polymer, then overbraiding that insulating polymer with a second electrically insulating sleeving and bonding the second insulating sleeving to the polymer with an impregnated polymer adhesive. The improvement is more fully disclosed in commonly assigned U.S. Pat. No. 4,389,587 and is herein incorporated by reference.

However, this unitary sleeving required the extra manufacturing step of impregnating the second insulating sleeve to bond it to the polymer insulation layer, thereby entailing labor costs and potential quality control problems for this item. The use of the impregnating polymer adhesive slightly inhibits the overall performance of the final product in two ways. First, it bonds the two layers together which makes for a stiffer product and second, the resin slightly reduces the amount of VPI resin which is absorbed into the glass. Additionally, the use of these adhesives limits the useful temperature ranges which can be achieved with this type of construction. This is important as advancements in motor generator design, require a higher temperature classification sleeving than the unitary sleevings constructed in the manner (class 155 acrylic sleeving) which is the base for the product described in U.S. Pat. No. 4,389,587.

Therefore, what is needed in this art is a high temperature unitary sleeving which has a super absorbent layer on the outside as well as a product that is very flexible.

DISCLOSURE OF INVENTION

The present invention is directed toward a unitary electrical sleeving comprising an inner layer, such a fiberglass, overcoated with a high temperature (class 200), electrical insulating polymer. This structure is then overbraided with a second layer of electrical insulting sleeving and which is bonded to the polymeric insulating layer by heat.

Also disclosed is a method of manufacturing the unitary sleeving wherein the inner sleeving of electrical insulation is coated with a flexible high temperature silicone polymer and then cured. Then an outer layer of electrically insulating sleeving is overbraided about the exterior of the cured polymer, the structure then heated under slight pressure to bond the outer overbraided sleeving to the polymer material forming the unitary structure.

The unitary sleeving according to the present invention, in addition to having requisite mechanical and electrical properties for use on such coil leads specifically adapted to VPI processing, can also be utilized reliably with minimal effort in other areas where the coils or unit is processed by the conventional dipping process.

Other features and advantages will be apparent from the specification and claims and from the accompanying drawings which illustrate an embodiment of the invention.

BEST MODE FOR CARRYING OUT THE INVENTION

Figures 1, 2:
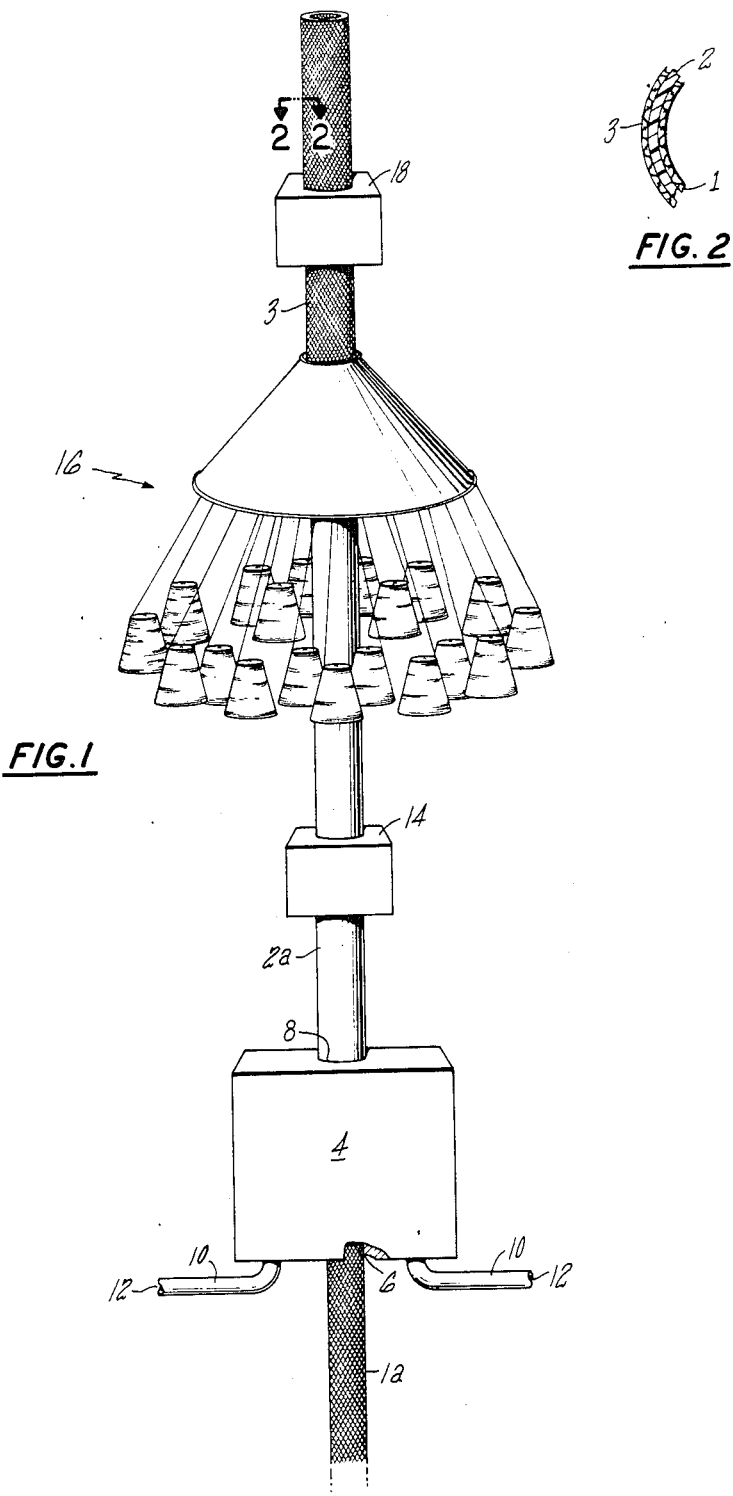
FIG. 1 shows the process of forming the unitary sleeving of the present invention.
FIG. 2 shows the cross-section of a typical unitary sleeving of the present invention.

In FIG. 2 the inner insulating layer 1, which may be any high temperature electrically insulating, flexible, ceramic or vitreous type yarn, i.e. fiberglass or other inorganic electrically insulating material, woven or knitted or braided into a tubular form, is overcoated with a high temperature, flexible electrically insulating silicone polymer 2 and the then coated tubular shaped structure is overbraided with a second layer of electrically insulating, inorganic material 3 similar to that used in the inner layer, such as fiberglass. The resulting structure is then heat treated to bond the outer sleeving to the polymer forming the unitary sleeving.

As the inner insulating layer 1, any conventional high temperature insulating material may be used to practice the present invention, although electrical grade fiberglass braided sleeving is preferred. Other materials which may be used are sleevings made from ceramics or other high temperature yarns capable of class 200 operation.

The high temperature yarn is then fabricated into the shape of the sleeving, which is generally tubular, by any number of well known techniques such as knitting, braiding, weaving etc. (For purposes of this application, the term braided shall be used as a generic term to indicate that any of the other methods of weaving or knitting, etc. may also be used). The preferred material being ECG type fiberglass, nontexturized yarn. These materials typically have densities of about 180,000 yds/lb to about 234 yds/lb and are woven or knitted with about 10 to about 50 pics/in with the preferred being about 20 to about 35 pics/in. The dimensions of the yarn filaments are primarily limited by the degree of flexibility desired in the final product. In general though, the diameter of such yarn filaments ranges from about 0.00015 inch to about 0.00051 inch. The filaments are arranged in bundles of filaments range in numbers, typically from about 50–2050 or higher. These bundles are known as yarn and it is these yarns which are then braided to form the tubular structure. Typically, the diameter of the tube will range from about 0.025 inch (0.635 mm) to about 2.0 inch (50.8 mm).

The flexible silicone rubbers used to overcoat this invention are, but not limited to, addition reaction, curable vinyl-functional, dimethyl siloxane polymers having suitable catalyst and cross-linking agents or room temperature vulcanizing silicone rubber blends, and should have a Shore-A durometer reading of about 40 or less. A number of such materials are commercially available and a list of those which have been particularly useful may be found in Table I along with their respective durometer readings.

TABLE I

| Material | Shore-A |
| --- | --- |
| Gen. Electric SLE 5600/5300 | 40 |
| Dow Corning Q3-9590 | 35 |
| Gen. Electric SLE 5500 | 28 |

Any of the aforementioned silicone rubbers may be used as formulated or may be modified to improve their flame retardance, thermal stability, etc., by addition of conventional modifiers.

Although any conventional method of making silicone coated inorganic yarn sleeving may be used to practice this invention, the preferred procedure is as follows:

The high temperature, inorganic yarn sleeving inner liner is fabricated into a continuous tube having the desired dimensions as described above. The sleeving is then, although not necessarily, conditioned by exposing it to sufficient heat to remove any sizing, broken filaments as well as to thermally stabilize it. Generally, this may be accomplished by drawing it through an open gas flame or an oven. The temperature should be high enough to remove the sizing but care must be taken not to allow the sleeving to melt causing it to become brittle and lose its flexibility.

Referring to FIG. 1, the conditioned sleeving 1A is then drawn through a die 4, where the silicone rubber is pressure bonded to it. The die 4 comprises an entry port 6, an exit port 8, conduits 10 and inlets 12 for the introduction of the silicone rubber into the die body where it is bonded to the sleeving 1A. This Figure is merely exemplary and is not limiting; it may be possible that other conventional techniques for bonding coatings to sleeving may be used as well.

The conditioned sleeve 1A is drawn into the die body 4 through the entry port 6. The size of this port should be just large enough to allow for easy passage of the sleeving 1A without causing crimping or collapsing of the sleeving. As the sleeving 1A passes through the die body 4, it is contacted with the silicone rubber which is introduced into the die body under pressure via the conduits 10. The silicone, due to it being under pressure, pressure bonds to the sleeving 1A and the coated sleeving 2A exits the die through the exit port 8. This exit port 8 has an inside diameter which is defined by the required silicone rubber wall. In general, the conditioned sleeving is drawn through the die 4 at speeds ranging from about 1 ft/min to about 40 ft/min. The particular speed at which the sleeving is drawn through the die is a function of the pressure at which the silicone is introduced into the die body 4 and the thickness of the silicone coating desired. The pressure at which the silicone rubber is introduced into the die body 4 will vary also, depending on the speed at which the sleeving is towed through the die. In general, this pressure will range from about 1 psi to about 100 psi with the preferred range being from about 40 psi to about 70 psi. The coated sleeving 2A is then passed into a curing oven 14 which cures the silicone rubber forming the finished silicone rubber coated sleeving.

This curing may be accomplished by exposing the silicone rubber coated sleeving to any conventional curing apparatus which may be used to cure silicone rubber and would be known to those skilled in the art. These may include, but should not be limited to radiant heat, convection heat, microwave, infrared or hot air vulcanization. In general, rubbers of this type cure at temperatures from about 375° F. (190° C.) to about 400° F. (204° C.)

It should be noted that in order to fabricate a silicone rubber coated sleeving of the present invention, with optimum physical properties, as little entrapped air as possible should be introduced into the rubber coating, for this may create voids in the cured material reducing the quality of the final sleeving. Sleeving of this type may be made using any wall thickness desired, however, generally the silicone coating will be between about 5 mils to about 80 mils.

Subsequent to the manufacture of the polymer coated sleeving 2A, a second layer of insulating inorganic material 3 is then overbraided about the outer surface of the sleeving 2A. (Overbraiding, as used in the application, means the yarn is braided directly about the exterior or the polymer coated structure to form an outer braided layer. However, the overbraid could conceivably be initially braided into a tubular structure and then slipped over the polymer coated sleeve. However, due to the friction of the silicone polymer, it is preferred to overbraid directly onto the sleeve.) The overbraiding process is conventional and is performed on conventional braiding machines 16. It has been found, however, that in order for the overbraid 3 to be uniform, it is desirable to maintain a slight pressure internally of the sleeving 2A during this process, to maintain the sleeve in a round configuration. The sleeve should not be distorted, but only maintained in a proper configuration to result in a uniform structure after braiding is complete. Typically, this may be accomplished by supplying a positive pressure via a gas supply (i.e. air, nitrogen) into the sleeve at a pressure of about 1 psig to about 15 psig.

It should be noted, however, that while this operation is described as "overbraiding", any conventional textile process of constructing such sleeving can be used. The thickness of this sleeving is generally, but need not be, the same as that of the inner layer and is generally from about 0.008 inch to about 0.050 inch (0.02 cm to 0.13 cm) thick. The primary function of the second layer of sleeving 3 is to provide a suitable substrate to which the VPI resin can thoroughly impregnate and adhere during subsequent processing. The overbraid will typically have a lower pic count than the inner layer ranging from about 10 to about 50 pics/in. Again this material will typically be the same as that of the inner layer with the preferred material being glass fibers. The higher the pic count, the tighter the weave and the greater the resin pick-up during VPI process, however, the cost also increases, therefore, the preferred pic count is about 10 pics/in to about 20 pics/in. Another variable is the yarn type which may be used. The heavier the type, or thicker the yarn, the greater the resin pick-up, however, the higher the cost. At this point in the process, the overbraided sleeving 3 is then drawn through a die 18 similar to the die 4 used for initial polymer application to the substrate, and then through a furnace causing the silicone rubber to bond to the second overbraided layer forming the unitary structure.

During the bonding process where the overbraid is heat bonded to the polymer, a majority of the braid must be in physical contact with the polymer. This is most easily accomplished by drawing the overbraided sleeve through the die and furnace under slight tension. This slight tension need only be sufficient to prevent sagging of the overbraid or sleeve which would lead to uneven heat treatment as it passes through the furnace. The entry die 18 should be slightly smaller than the outside diameter of the sleeving so that upon entry a slight pressure is applied between the overbraided outer insulating layer and the polymer resulting in a more uniform contact between these two constituents and thereby resulting in a uniform bonding. The actual mechanism for bonding the outer braid to the polymer is not known. However, it is believed that by maintaining the braid in contact with the polymer surface and under minimal pressure, the braid is contacted (slightly embedded, impressed onto the surface, or slightly surrounded by) to the softened polymer. The strength of the bond need not be great to make the product, as one is trying only to prevent the outer sleeving from moving during handling and processing.

The temperature at which this process is carried out will vary depending on the polymer selected, the overbraid yarn used and the residence time in the furnace (the speed at which it is drawn through the furnace). These parameters are easily determined by simple experimentation. Too high a furnace temperature or too long a residence time will result in degradation of the polymer while too low a furnace temperature or too short a residence time in the furnace will result in insufficient bonding.

These temperatures will vary depending on the polymer selected but will generally be about 1000° F. (537.8° C.). The particular temperature should be high enough to soften the surface of the polymer and allow the braid to bond to it. This heating process performs a dual function of bonding the polymer to the outer layer of insulation as is stated above and additionally, removing the sizing or starch present on the inorganic outer sleeving which could impair the adhesion, absorption and uniform distribution of the VPI resin during its introduction.

The sizing present on the braiding fibers assists in the braiding process by reducing the friction between the tows of braid as they pass in contact with one another during the braiding machine. However, this sizing, if allowed to remain on the fibers, reduces the ability of the braided structures to take up resin during the VPI process. Because of the nature of the materials used and the particular process, it is possible to heat the braided material to such a temperature that the sizing is removed. This results in the braid being able to pick up as much as 50 percent more of the resin during VPI processing over braid material still having the sizing present.

The particular furnace used to bond the overbraid to the polymer may be conventional and should be capable of heating to about 1800° F. (982° C.). Typically these will be gas or electric furnaces with the preferred being a gas fired ring type furnace. In order to have sufficient residence time for the sleeve at temperature, a series of these ring furnaces or other furnaces may be used.

Electrical insulating sleeving of this type is required to conform to certain strict industry standards concerning their physical and electrical properties before they may be used in certain applications. These standards are well known to those skilled in the art and include ASTM, Underwriters Lab, NEMA, and the U.S. Military specifications. The sleeving of the present invention meets or exceeds all of these applicable standards for class 200 type electrical insulating sleeving as well as being substantially more flexible.

EXAMPLE

A highly flexible silicone rubber coated fiberglass sleeving having an ID of 0.258 inch and an OD of 0.358 inch was produced using the following method.

Fiberglass sleeving made on a 96 carrier NE Butt Braider having yarns of ECG-150 ⅔ type, 36 pics to the inch on a 0.437 inch rod was drawn through a gas flame at 60 ft/min to remove broken fibers, sizing and to heat stabilize it. It was then drawn at a towing speed of 5 ft/min into a die which had an internal dimension of the bottom die of 0.2950 inch (7.49 mm). General Electric SLE 5500 silicone rubber, which was mixed in proper proportions on a Fluid Automation meter/mix machine, was introduced into the die mechanism under 60 psi pressure. The silicone rubber contacted the sleeving as it passed through the die pressure bonding it to the fiberglass sleeving. The coated sleeving was then drawn through the opening of the top die having an internal dimension of 0.3660 inch (5.61 mm).

The silicone rubber coated fiberglass sleeving was then drawn through a 30 foot high electrically heated curing oven. The curing temperature of this particular silicone rubber polymer is about 400° F. (204° C.) so the tower had a temperature profile from bottom to the top of about 400° F. (204° C.) to about 500° F. (260° C.). Upon exiting from the top of the oven, the sleeving was cooled to about 75° F. (23.9° C.) (ambient) and placed on a take-up roll.

Thereafter, an air supply was introduced at one end of the sleeving and a positive pressure of about 1 psig was created inside the tube. This maintained the round shape of the sleeving during the overbraiding process. The overbraiding process was performed on a conventional braiding machine (NE Butt Braider) using ECG-150 ⅓ type, 10 pics to the inch. The overbraided sleeving was then placed on a reel or spool. The braided sleeve was then drawn from the reel under slight tension which was supplied from the inertia of the reel, through a die having an internal diameter of 0.397 inch. The sleeve was then passed through a series of three ring gas burners each 2 inches long and 3 inches in diameter positioned 8 inches apart on center. These burners generated an internal temperature of 1000° F. (537.8° C.). The sleeve was drawn through at a rate of 28 feet/minute and then cooled to room temperature (75° F.) (23.9° C.) and wound on a reel. One of the advantages resulting from this process was that the furnace temperature is hot enough to remove the sizing from the overbraid. The removal of the sizing in the braid allows for substantially more resin absorption than if the braid is not treated. This may amount to as much as a 50 percent increase. The physical characteristics and performances of the sleeve are shown in Table II.

TABLE II

| Property | Value |
| --- | --- |
| Inside diameter | .258" |
| Outside diameter | .358" |
| Fiberglass wall thickness | .024" |
| Silicone rubber wall thickness | .026" |
| Dielectric breakdown voltage | |
| (a) average | 22,000 volts |
| (b) minimum individual | 19,000 volts |
| Durometer Reading | 28 |
| Flexibility | 100 grams |

The sleeving taught by this invention offers a number of benefits not available in prior art sleeving technology. First, these are high temperatures (class 200) VPI sleeves which have improved flexibility for easier application. Secondly, they do not require the use of an adhesive bonding agent to bond the overbraid to the polymer thereby reducing the cost of the manufacture and its complexity. Thirdly, the elimination of the bonding agent and the ability to remove the sizing from the outer braid allows for more resin to be absorbed during the VPI process due to its absence. This pick-up may be as high as a 50 percent increase over other VPI overbraided materials which do not have the sizing removed.

The unitary sleeving offers cost savings in tes of labor by requiring only a simple application of a single sleeve into the electrical conductor. This avoids the prior art practices of telescoping two or more sleeves over the conductor or more typically requiring the sleeve to be wraped with a seperate layer of fiber tape prior to impregnation. All of these prior art practices being more labor intensive and subject to error than the present unitary sleeves.

It should be understood that the invention is not limited to the particular embodiments shown and described herein, but that various changes and modifications may be made without departing from the spirit and scope of this novel concept as defined by the following claims.

We claim:

1. A unitary, flexible, electrically insulating sleeving consisting essentially of a braided tubular inner layer of electrically insulating yarns, overcoated with a high temperature, electrically insulating flexible silicone polymer which is cured and an outer layer of electrically insulating yarn overbraided and head bonded to the cared insulating polymer resulting in a unitary insulating sleeving having high dielectric strength and improved flexibility.

2. The article of claim 1 wherein the inner and outer layers of insulating material are each formed of braided fiberglass.

3. The article of claim 2 wherein the fiberglass yarn has about 10 pics per inch to about 50 pics per inch.

4. The article of claim 1 wherein the silicone polymer has a Shore A durometer hardness of 40 or lower.

* * * * *

UNITED STATES PATENT AND TRADEMARK OFFICE
CERTIFICATE OF CORRECTION

PATENT NO. : 4,775,566
DATED : October 4, 1988
INVENTOR(S) : Louis G. Landry and Fabian Nunez It is certified that error appears in the above-identified patent and that said Letters Patent is hereby corrected as shown below:

In the Specification, Column 8, line 11 "tes" should be -- terms --.

In the claims, column 8, line 31, "head" should be -- heat --; line 32, "cared" should be -- cured --.

Signed and Sealed this

Fourth Day of July, 1989

Attest:

DONALD J. QUIGG

*Attesting Officer*         *Commissioner of Patents and Trademarks*